(12) United States Patent
Bunker

(10) Patent No.: US 9,346,465 B2
(45) Date of Patent: *May 24, 2016

(54) SPEED AND SEVERITY TRIGGER FOR AN ACTIVE DEVICE OF A VEHICLE

(75) Inventor: Paul Bunker, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,740

(22) Filed: Mar. 29, 2012

(65) Prior Publication Data

US 2013/0090780 A1   Apr. 11, 2013

(30) Foreign Application Priority Data

Mar. 29, 2011  (GB) .................................. 1105277.6

(51) Int. Cl.
| | |
|---|---|
| B60R 21/013 | (2006.01) |
| B60W 40/12 | (2012.01) |
| B60R 21/0132 | (2006.01) |
| B60T 8/1755 | (2006.01) |
| B60R 21/01 | (2006.01) |

(52) U.S. Cl.
CPC ............ *B60W 40/12* (2013.01); *B60R 21/0132* (2013.01); *B60T 8/17551* (2013.01); *B60R 2021/01252* (2013.01); *B60R 2021/01313* (2013.01)

(58) Field of Classification Search
CPC ...................... B60R 21/01; B60R 2021/01013; B60R 2021/01204; B60R 2021/01211; B60R 2021/01218; B60R 2021/01265; B60R 2021/01272; B60R 2021/01279; B60R 21/013; B60R 2021/0132; B60R 2021/01322; B60R 21/017; B60R 22/343; B60R 22/36; B60R 22/40; B60R 22/42; B60R 22/46; B60R 22/48; B60R 21/0132; B60R 2021/01313; B60R 2021/01252; B60W 40/12; B60T 8/17551

USPC ................................................ 701/36, 45, 49

See application file for complete search history.

(56) References Cited

U.S. PATENT DOCUMENTS

| | | | |
|---|---|---|---|
| 4,985,835 A | | 1/1991 | Sterler et al. |
| 5,021,678 A | * | 6/1991 | Diller .......................... 307/10.1 |

(Continued)

FOREIGN PATENT DOCUMENTS

| | | |
|---|---|---|
| CN | 1646348 A | 7/2005 |
| DE | 102008008850 A1 | 8/2009 |

(Continued)

OTHER PUBLICATIONS

UK Search Report for GB1105277.6, dated Jul. 26, 2011, 4 pages.

(Continued)

*Primary Examiner* — Helal A Algahaim
*Assistant Examiner* — Genna Mott
(74) *Attorney, Agent, or Firm* — Reising Ethington P.C.

(57) ABSTRACT

A method of determining the category of action of an active device of a vehicle comprises repeatedly measuring a vehicle parameter indicative of a change of vehicle state, determining a rate of change of the vehicle parameter and determining a modified vehicle parameter by reference to the rate of change. A threshold is applied to the modified vehicle parameter and a trigger signal is generated for an active device of the vehicle in response to the threshold being reached and in accordance with a severity of the vehicle parameter, which may be vehicle speed related.

19 Claims, 3 Drawing Sheets

(56) References Cited

U.S. PATENT DOCUMENTS

| | | | | |
|---|---|---|---|---|
| 5,337,238 | A * | 8/1994 | Gioutsos | B60R 21/0132 180/282 |
| 5,363,302 | A * | 11/1994 | Allen et al. | 701/46 |
| 5,418,722 | A * | 5/1995 | Cashler | 701/45 |
| 5,519,613 | A | 5/1996 | Gioutsos et al. | |
| 5,559,697 | A * | 9/1996 | Wang | B60R 21/0132 180/282 |
| 6,002,974 | A * | 12/1999 | Schiffmann | 701/36 |
| 6,002,975 | A * | 12/1999 | Schiffmann | B60R 21/0132 180/282 |
| 6,038,495 | A * | 3/2000 | Schiffmann | B60R 21/013 180/282 |
| 6,186,539 | B1 | 2/2001 | Foo et al. | |
| 6,314,327 | B1 * | 11/2001 | Mugler | G05B 13/026 700/40 |
| 6,332,629 | B1 * | 12/2001 | Midorikawa et al. | 280/806 |
| 6,374,172 | B1 | 4/2002 | Yamaguchi et al. | |
| 6,394,495 | B1 * | 5/2002 | Specht | 280/806 |
| 6,409,270 | B1 * | 6/2002 | Meder | 297/464 |
| 6,485,057 | B1 * | 11/2002 | Midorikawa et al. | 280/807 |
| 7,250,850 | B2 * | 7/2007 | Mizutani | 340/435 |
| 7,292,921 | B2 | 11/2007 | Schuller et al. | |
| 2001/0025215 | A1 * | 9/2001 | Hermann | B60R 21/0132 701/45 |
| 2003/0074137 | A1 | 4/2003 | Ota | |
| 2005/0080530 | A1 * | 4/2005 | Arduc | B60G 15/063 701/37 |
| 2005/0113983 | A1 * | 5/2005 | Schubert | B60R 21/0132 701/1 |
| 2006/0085114 | A1 | 4/2006 | Roelleke et al. | |
| 2006/0129295 | A1 | 6/2006 | Foo et al. | |
| 2006/0237960 | A1 * | 10/2006 | Kudo et al. | 280/806 |
| 2007/0017727 | A1 | 1/2007 | Messih et al. | |
| 2008/0033612 | A1 | 2/2008 | Raab | |
| 2008/0172156 | A1 * | 7/2008 | Joh et al. | 701/45 |
| 2008/0201042 | A1 * | 8/2008 | Cuddihy et al. | 701/45 |
| 2008/0221758 | A1 * | 9/2008 | Bernzen et al. | 701/45 |
| 2008/0243342 | A1 * | 10/2008 | Breed | B60R 21/0132 701/45 |
| 2008/0270000 | A1 * | 10/2008 | Bernzen | 701/79 |
| 2010/0324787 | A1 | 12/2010 | Kaerner et al. | |
| 2012/0038139 | A1 * | 2/2012 | Borg et al. | 280/741 |

FOREIGN PATENT DOCUMENTS

| | | |
|---|---|---|
| EP | 1350697 | 3/1996 |
| GB | 2343977 A | 5/2000 |
| GB | 2419213 | 4/2006 |
| GB | 2442097 | 3/2008 |
| WO | WO96/06758 | 3/1996 |
| WO | 03106226 A1 | 12/2003 |
| WO | WO 2010109153 A1 * | 9/2010 |

OTHER PUBLICATIONS

English Translation of Chinese Office action corresponding to CN application No. 201210089063.X, dated Mar. 2, 2015, 9 pages.

European search report corresponding to EP application No. 12161994.4-2423, dated Jul. 20, 2012, 3 pages.

* cited by examiner

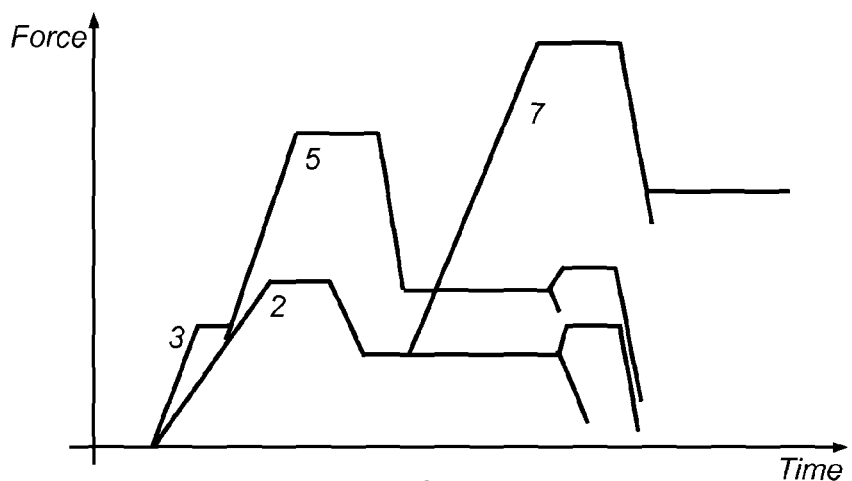
*Fig 6*
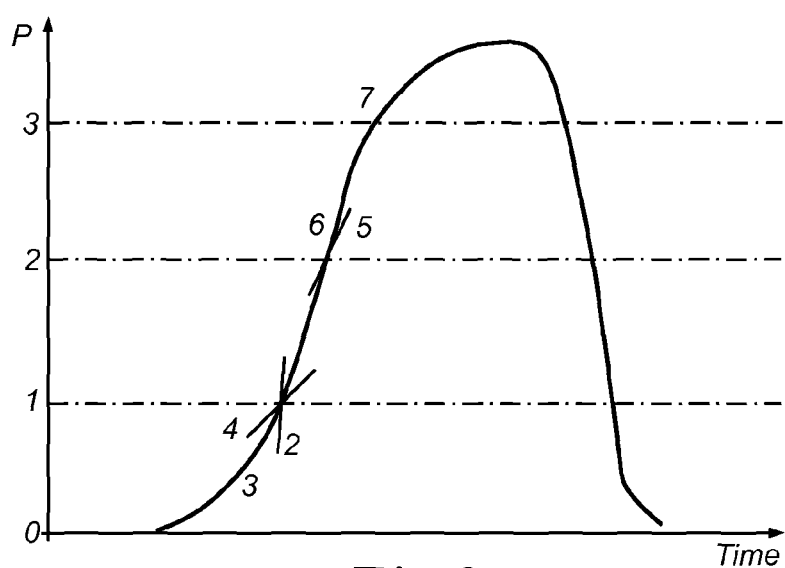
*Fig 7*
*Fig 8*

SPEED AND SEVERITY TRIGGER FOR AN ACTIVE DEVICE OF A VEHICLE

FIELD OF INVENTION

This invention relates to vehicle systems, and is particularly but not exclusively concerned with the triggering of an active device of a vehicle, with a speed and a severity appropriate to a change in vehicle state, typically a vehicle maneuver. Aspects of the invention relate to a method, to a system and to a vehicle.

BACKGROUND

Active devices of vehicles are defined in this document as devices which may be actuated, typically by electric motor, in response to a change in vehicle state. The change in state may for example be a braking event, or a vehicle maneuver such as cornering. Examples of active devices are seat restraints and aerodynamic aids. Active devices are typically re-settable, thus permitting repeated activation and de-activation according to demand.

It is known to trigger an active device according to proximity of an obstacle, according to a vehicle speed threshold, and also according to a lateral acceleration threshold of a vehicle.

Active devices are useful but the control strategy may have difficulty in distinguishing a planned maneuver, for which no action is required, from an unplanned maneuver. Repeated or late actuation of such devices, can also be an unwanted distraction for the vehicle driver.

What is required is a method and system of determining the required speed and severity of deployment of an active device at a predetermined threshold. Ideally it should be possible to make operation of the system apparent to vehicle occupants, without being distracting.

It is an aim of the present invention to address this issue. Other aims and advantages of the invention will become apparent from the following description, claims and drawings.

SUMMARY OF THE INVENTION

According to one aspect of the present invention for which protection is sought there is provided a method of determining a category of action of an active device of a vehicle, the method comprising the steps of:

repeatedly measuring a vehicle parameter indicative of a change of vehicle state;

determining a rate of change of said vehicle parameter;

modifying said vehicle parameter by reference to said rate of change;

applying a threshold to said modified vehicle parameter, determining a severity of said vehicle parameter, and determining a category of action for an active device of the vehicle according to said severity and in response to said threshold being reached.

The vehicle parameter may be indicative of position, braking, change of direction, lateral acceleration, yaw or any other indicator of departure of the vehicle from a straight steady state condition.

More than one threshold is applied to said modified vehicle parameter in order to indicate successive levels of response, for example to change the speed of deployment of an aerofoil device. Increasing level of severity is indicative of, for example, different angles of deployment of an aerodynamic device.

By severity is meant an overall measure of the increasing effect of the vehicle parameter upon the vehicle and the occupants thereof. Thus a high speed cornering event may have a higher severity than a low speed cornering event for a given cornering radius. Similarly a small radius corner may have a higher severity than a large radius corner for a given vehicle speed.

The threshold(s) applied to the modified vehicle parameter may be identified numerically, and in the range 0-3 where 0 indicates no action (inhibit), 1 equals low, 2 equals medium and 3 indicates maximum. The severity may also be identified numerically, and in the same range 0-3.

More or fewer thresholds and severities may be selected, but three is considered a reasonable number for practical application to a vehicle system.

Typically the modified vehicle parameter is advanced in time with respect to the measured parameter, by an amount which varies according to the rate of change of said vehicle parameter. The vehicle parameter may be any of those mentioned above, and is for example indicative of a departure from a straight, steady speed condition of the vehicle. The numerical value of the severity may indicate no adjustment, small adjustment, medium adjustment and maximum adjustment.

Thus for example the speed of refraction of an active seat belt tensioner, or the speed of deployment of an aerodynamic device will change according to the modified vehicle parameter. The load applied by an active seat belt tensioner, or the angle of an aerodynamic device will change according to the severity which has been determined.

The modified parameter and severity may for example be determined from a respective algorithm or from a look-up table containing values appropriate to the range of available/adjustment for deployment or actuation of the active device(s). Those skilled in the art will be able to select an appropriate range according to his knowledge and training, and according to the individual vehicle or vehicle model to which the invention is applied. Different active devices may respond differently according to individually applied thresholds, and severities.

In each case the method may be inhibited below a value appropriate to the parameter being measured. Thus an active aerodynamic device sensitive to vehicle speed may not be required to be actuated below a predetermined speed of, for example 25 mph. An active device sensitive to lateral acceleration of the vehicle or roll of the vehicle body may be inhibited below a respective predetermined value of lateral acceleration or roll. An active occupant restraint may be inhibited below 5 mph.

The vehicle parameter is conveniently indicated by an electronic signal representative of the instant state thereof, for example in the form of a voltage. Thus an electronic signal of brake pressure may be available on a vehicle CAN-bus or the like, and be processed in a vehicle electronic control unit (ECU). A clock signal of the ECU may be used to calculate rate of change of brake pressure. An electronic signal of vehicle speed is indicative of the severity associated with the vehicle parameter.

The modified vehicle parameter may change stepwise at a plurality of thresholds and may also be represented by electronic signals. Alternatively the modified vehicle parameter may change proportionately, at a rate dependent upon the rate of change of the parameter signal. The proportionate change may be fixed between two adjacent thresholds, and may change to a different proportion upon crossing a threshold.

In a cornering event, an active seat belt tensioner may be inhibited below a first threshold vehicle speed, be tensioned at a first severity rate between the first threshold vehicle speed and a second threshold vehicle speed, and be tensioned at a second severity rate between the second threshold vehicle speed and a third threshold vehicle speed. Above the third threshold, tension is at a maximum severity rate regardless of a further vehicle speed increase.

The invention may be implemented in any electronic control unit (ECU) of a vehicle operating system, and may use inputs from a CAN-bus system, or suitable equivalent.

Within the scope of this application it is envisaged that the various aspects, embodiments, examples, features and alternatives set out in the preceding paragraphs, in the claims and/or in the following description and drawings may be taken independently or in any combination thereof.

BRIEF DESCRIPTION OF THE DRAWINGS

The present invention will now be described, by way of example only, with reference to the accompanying drawings, in which:

FIG. 6 shows the outputs of FIGS. 4 and 5 in a matrix;

FIG. 7 illustrates motor torque as a result of the matrix of FIG. 6;

FIG. 8 shows the effect of the matrix of FIG. 6 with respect to brake pressure;

DETAILED DESCRIPTION OF THE ILLUSTRATED EMBODIMENTS

Figure 1:
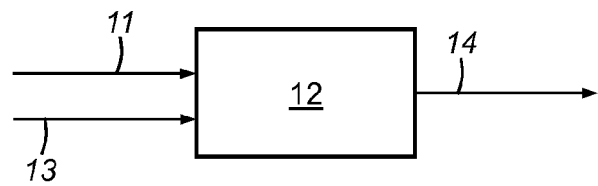
FIG. 1 is a block diagram showing how speed and severity of an event may be calculated.
Figure 1:
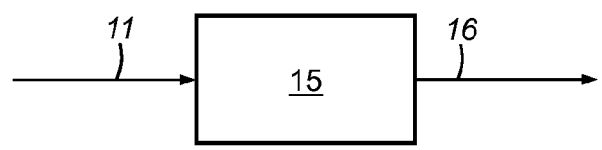

With reference to FIG. 1, an embodiment of the invention is described particularly by reference to vehicle speed and vehicle brake pressure.

The input signal (11) to be processed (in this case an electrical output indicative of brake pressure) is input to a first calculation module (12) together with an input (13) indicative of vehicle speed. From these inputs (11, 13) is calculated an output (14) indicative of severity of the required action—for example retraction of a seat belt or deployment of an aerodynamic device. Typically the output (14) is applied to one or more electric motors associated with the active device. The severity is typically raised as vehicle speed increases.

Additionally, the input signal (11) is also applied to a second calculation module (15) in which rate of change of the input signal determines the output (16). This output (16) is the modified vehicle parameter indicative of the speed of the required action Thus the severity output (14) may be used to indicate discrete steps in the load to be applied via an active seat belt tensioning motor, and the speed output (16) may indicate the speed of action of the active seat belt tensioning motor.

Each output may be defined as discrete steps determined by thresholds, as explained by reference to FIGS. 2-5.

Figure 2:
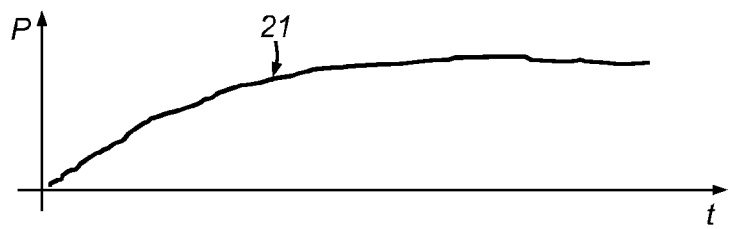
FIGS. 2-5 show graphically how a braking event may be used to generate numerical outputs indicative of speed and severity.

FIG. 2 illustrates a typical rise of brake pressure (21) over time, as indicated by, for example, an electrical transducer in the vehicle brake system, for example in a brake line, downstream of a brake master cylinder. Pressure P rises progressively towards a maximum whilst the vehicle brakes are being applied.

Figure 3:
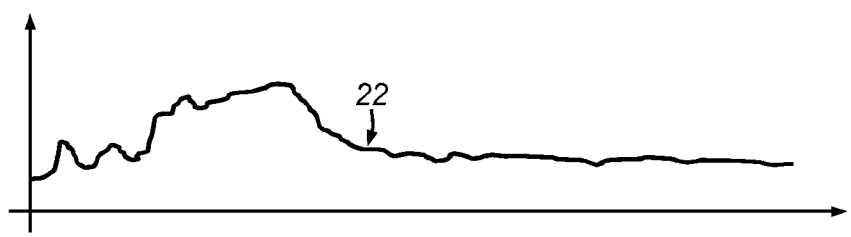

Rate of change of brake pressure (22) is illustrated in FIG. 3, as determined in calculation module (15) with reference to a clock signal.

Figure 4:
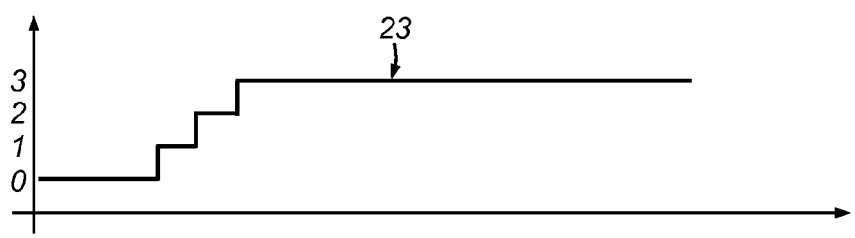

Severity of brake application (23), which is indicated by the level of brake pressure as modified by vehicle speed, is indicated in FIG. 4, and comprises step changes as three successive speed related pressure thresholds are reached. Outputs at these thresholds are assigned numerical values 0-3. Although severity is indicated in this example according to vehicle speed, in which case the category is responsive to successive thresholds of brake system pressure.

Figure 5:
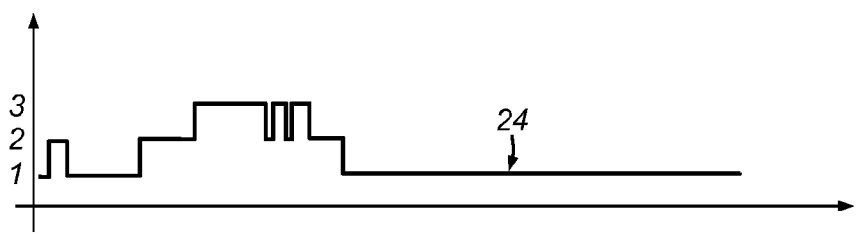

FIG. 5 shows speed of brake application (24) over time, as indicated by rate of change of brake pressure at predetermined brake pressure thresholds, and again represented numerically as 1-3.

The numerical outputs in the range 1-3 may be represented by a matrix, as shown in FIG. 6, and summed so as to give greater effect to severity and speed values, in the direction downward and to the right of the matrix.

The positions of the matrix represent categories for control of an electric motor of an active device. FIG. 6 uses only categories 2-7, but a full range now follows:

TABLE I

| Category | Description |
| --- | --- |
| 0 | No trigger |
| 1 | (Haptic warning) |
| 2 | low force, low speed |
| 3 | low force, medium speed |
| 4 | low force, high speed |
| 5 | medium force, medium speed |
| 6 | medium force, high speed |
| 7 | high force, high speed |

Thus three numerical outputs for each of speed and severity allow a tailored response, without excessive complication. A haptic warning may optionally be included for certain low level conditions, typically as a vibration alert for the vehicle driver.

Those skilled in the art will be able to select a category for each combination of speed and severity, and the same category may be appropriate for different combinations, according to the active device, the vehicle type and other relevant factors.

FIG. 7 illustrates one example of how an actuator, such as an electric motor, of an active device could respond to the numerical outputs of the matrix of FIG. 6. Different force/time characteristics are represented by way of example.

FIG. 8 illustrates the effect of the matrix of FIG. 6 with reference to a plot of brake pressure P over time t. Force levels 0-3 (severity) are indicated on the Y-axis (i.e. brake pressure thresholds). Speed of action (in one example speed of active seat belt tensioning) is indicated by the gradient of the crossing lines at the thresholds.

The possible outputs 2-7 are indicated according to low force (level 1), medium force (level 2) and high force (level 3).

Figure 9:
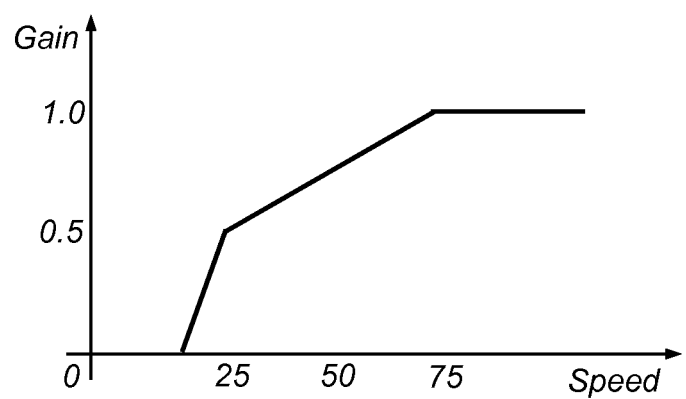
FIG. 9 shows a characteristic relating signal gain to vehicle speed.

With reference to FIG. 1, an applied gain may comprise a step change in output according to vehicle speed and defined transition points. Thus, as illustrated in FIG. 9, a first progressive gain rate is provided for vehicle speed in the range 20-25 mph, and a second lower progressive rate in the range 25-70 mph. The gain at 25 mph is 0.5, increasing to 1.0 at 70 mph and above.

Figure 10:
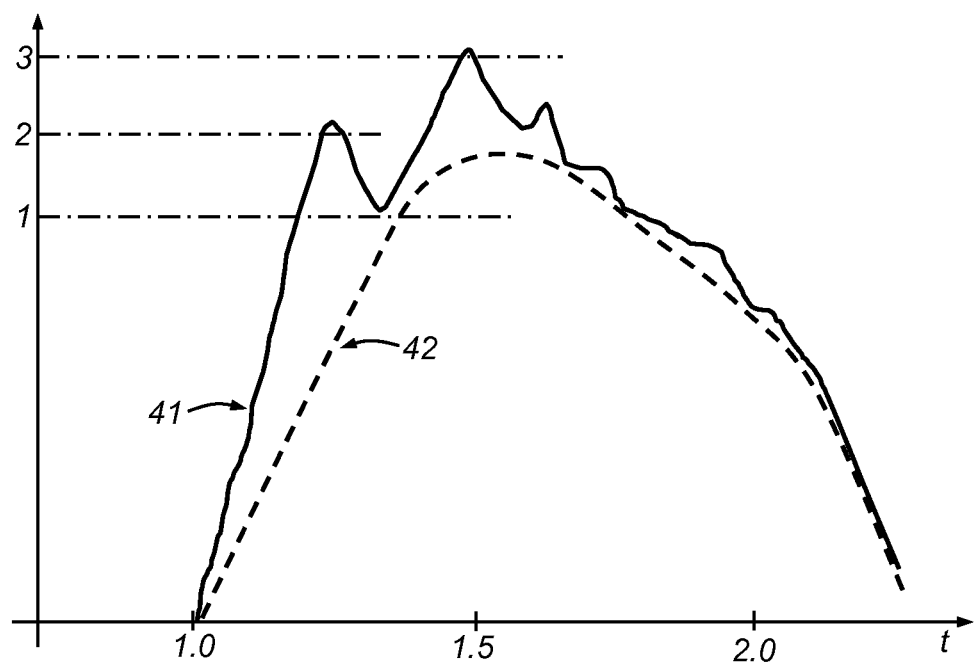
FIG. 10 shows a predictive braking characteristic related to increasing speed and severity of the braking event.

FIG. 10 illustrates a braking event in which brake pressure is plotted against time t. The brake pressure characteristic (41)

is modified according to a vehicle specific algorithm or lookup table not described here, so as to be in advance of actual brake pressure (42) in time.

Trigger points 1-3 are provided at force levels 1-3 corresponding to increasing tension in a seat belt, or for example increasing attack angle of an aerodynamic aid such as a boot mounted spoiler. Thus the trigger points may correspond to particular values of the modified parameter.

The low trigger point is reached as the predictive characteristic (41) crosses the threshold 1, and an active seat belt tensioner reacts to apply a low force to the occupant. Threshold 2 represents a medium seat belt tension whilst threshold 3 represents maximum seat belt tension. Under category 3 braking, the application of increasing seat belt tension can be progressive, avoiding a jerky and intrusive restraint. At levels 1 and 2 the occupant can be aware that the tensioning system is working notwithstanding that a higher threshold is not reached. In this way even low level braking can result in a modest increase in belt tension, reducing belt slack from around the occupant, which the vehicle occupants may find reassuring.

In FIG. 10, force level 1 corresponds to outputs 2-4 of the matrix of FIG. 6; force level 2 corresponds to outputs 5 and 6, and force level 3 corresponds to output 7.

Other advantages will be apparent to one skilled in the art and the present examples and embodiments are to be considered illustrative and not restrictive. The invention is not to be limited to the details given herein, but may be modified within the scope and equivalence of the appended claims.

The invention claimed is:

1. A method of determining a category of action of an active device of a vehicle, the method comprising:
   measuring a vehicle parameter indicative of a change of vehicle state;
   determining a rate of change of said vehicle parameter;
   modifying said vehicle parameter to a modified vehicle parameter by reference to said rate of change, wherein said modified vehicle parameter is advanced in time with respect to said measured vehicle parameter;
   applying a threshold to said modified vehicle parameter;
   determining a severity of said vehicle parameter in dependence on said threshold;
   determining the category of action for the active device of the vehicle according to said severity in response to said modified vehicle parameter reaching said threshold, wherein determining the category of action comprises determining a speed of actuation of the active device from a plurality of actuation speeds in dependence on the modified vehicle parameter when the threshold is reached; and
   triggering said active device according to said category of action in dependence on said modified vehicle parameter reaching said threshold.

2. The method of claim 1, wherein said rate of change is determined by reference to successive measurements of said vehicle parameter and a clock signal.

3. The method of claim 1, wherein the category of action relates said modified vehicle parameter and said severity.

4. The method of claim 3, wherein said category of action is represented by a discrete value of a numerical range.

5. The method of claim 1, wherein said category of action indicates one or more of the speed of movement of the active device, the position of the active device and the load generated by the active device.

6. The method of claim 1, wherein the vehicle parameter is selected from the group consisting of vehicle position, vehicle speed, vehicle braking, change of direction of the vehicle, and lateral acceleration of the vehicle.

7. The method of claim 1, and having a plurality of successive thresholds for generating successive categories of action.

8. The method of claim 7, wherein the plurality of successive thresholds increase the category of action of the active device, by reference to one of speed, position and load.

9. The method of claim 1, wherein triggering said active device comprises triggering said active device when said modified vehicle parameter meets or exceeds said threshold.

10. The method of claim 1, wherein triggering said active device comprises triggering said active device when said threshold is crossed in a decreasing direction of said modified vehicle parameter.

11. The method of claim 1, wherein the modified vehicle parameter is determined from a look-up table.

12. The method of claim 1, wherein the modified vehicle parameter is determined from an algorithm.

13. The method of claim 1, wherein said severity is determined by reference to vehicle speed.

14. The method of claim 1, wherein determining the severity of said vehicle parameter comprises determining said severity based on a first input signal indicative of the vehicle parameter and a second input signal indicative of vehicle speed.

15. The method of claim 1, wherein:
   applying the threshold to said modified vehicle parameter comprises applying a plurality of thresholds to said modified vehicle parameter; and
   determining the category of action for said active device comprises determining said category of action according to said severity of said vehicle parameter and in response to one or more of said thresholds being reached.

16. The method of claim 1, wherein determining the category of action of the active device comprises determining the category of action from a plurality of categories of action according to said severity in response to said threshold being reached, wherein each of said plurality of categories of action correspond to a different action to be taken by said active device.

17. The method of claim 1, wherein said modifying step comprises modifying said vehicle parameter to a modified vehicle parameter by using said rate of change.

18. A system for determining a category of action of an active device of a vehicle, said system comprising an electronic control unit that is adapted to:
   measure a vehicle parameter indicative of a change of vehicle state;
   determine a rate of change of said vehicle parameter;
   modify said vehicle parameter to a modified vehicle parameter by reference to said rate of change, wherein said modified vehicle parameter is advanced in time with respect to said measured vehicle parameter;
   apply a threshold to said modified vehicle parameter;
   determine a severity of said vehicle parameter in dependence on said threshold;
   determine the category of action for the active device of the vehicle according to said severity in response to said modified vehicle parameter reaching said threshold, wherein determining the category of action comprises determining a speed of actuation of the active device from a plurality of actuation speeds in dependence on the modified vehicle parameter when the threshold is reached; and trigger said active device according to said category of action in dependence on said modified vehicle parameter reaching said threshold.

19. A vehicle comprising a system for determining a category of action of an active device of the vehicle, said system comprising an electronic control unit that is adapted to:
   measure a vehicle parameter indicative of a change of vehicle state;
   determine a rate of change of said vehicle parameter;
   modify said vehicle parameter to a modified vehicle parameter by reference to said rate of change, wherein said modified vehicle parameter is advanced in time with respect to said measured vehicle parameter;
   apply a threshold to said modified vehicle parameter;
   determine a severity of said vehicle parameter in dependence on said threshold;
   determine the category of action for the active device of the vehicle according to said severity in response to said modified vehicle parameter reaching said threshold, wherein determining the category of action comprises determining a speed of actuation of the active device from a plurality of actuation speeds in dependence on the modified vehicle parameter when the threshold is reached; and
   trigger said active device according to said category of action in dependence on said modified vehicle parameter reaching said threshold.

* * * * *